United States Patent
Avermeyer et al.

(10) Patent No.: US 11,267,181 B2
(45) Date of Patent: Mar. 8, 2022

(54) METHOD FOR PREPARING FOR A CHANGE OF MATERIAL IN AN EXTRUSION DEVICE FOR A FILM MACHINE

(71) Applicant: Windmöller & Hölscher KG, Lengerich (DE)

(72) Inventors: Ansgar Avermeyer, Georgsmarienhütte (DE); Tobias Kulgemeyer, Hagen a.T.W. (DE)

(73) Assignee: Windmöller & Hölscher KG, Lengerich (DE)

( * ) Notice: Subject to any disclaimer, the term of this patent is extended or adjusted under 35 U.S.C. 154(b) by 211 days.

(21) Appl. No.: 15/561,822

(22) PCT Filed: May 10, 2016

(86) PCT No.: PCT/EP2016/060442
§ 371 (c)(1),
(2) Date: Sep. 26, 2017

(87) PCT Pub. No.: WO2016/198221
PCT Pub. Date: Dec. 15, 2016

(65) Prior Publication Data
US 2018/0050480 A1    Feb. 22, 2018

(30) Foreign Application Priority Data
Jun. 8, 2015   (DE) ..................... 10 2015 108 974.2

(51) Int. Cl.
*B29C 48/25*     (2019.01)
*B29C 48/92*     (2019.01)
(Continued)

(52) U.S. Cl.
CPC .......... *B29C 48/2692* (2019.02); *B29B 7/603* (2013.01); *B29C 48/271* (2019.02);
(Continued)

(58) Field of Classification Search
CPC . B29C 48/2692; B29C 48/269; B29C 48/288; B29C 48/92; B29C 2948/92485; B29C 2948/9298
See application file for complete search history.

(56) References Cited

U.S. PATENT DOCUMENTS

| | | | |
|---|---|---|---|
| 5,127,450 A * | 7/1992 | Saatkamp | B29B 17/0005 141/9 |
| 5,148,943 A * | 9/1992 | Moller | B29C 31/02 222/1 |
| 2017/0305056 A1 * | 10/2017 | Schramm | B29C 48/286 |

FOREIGN PATENT DOCUMENTS

| | | |
|---|---|---|
| DE | 10018321 A1 | 1/2001 |
| DE | 202004015743 U1 | 2/2006 |

(Continued)

OTHER PUBLICATIONS

Machine translation for DE102004051196 (Year: 2006).*
(Continued)

*Primary Examiner* — Timothy Kennedy
*Assistant Examiner* — Alexander A Wang
(74) *Attorney, Agent, or Firm* — Rudy J. Ng; Bret E. Field; Bozicevic, Field & Francis LLP

(57) ABSTRACT

The above object is solved by means of a method comprising the features as described herein as well as an extrusion device comprising the features as described herein. Further features and details of the invention follow from the depending claims, the description and the drawings. It goes without saying that features and details, which are described in connection with the method according to the invention, shall thereby also apply in connection with the extrusion device according to the invention and in each case vice versa, so that, with regard to the disclosure, reference is or can always be mutually made, respectively, to the individual invention aspects.

8 Claims, 7 Drawing Sheets

Figure 1:
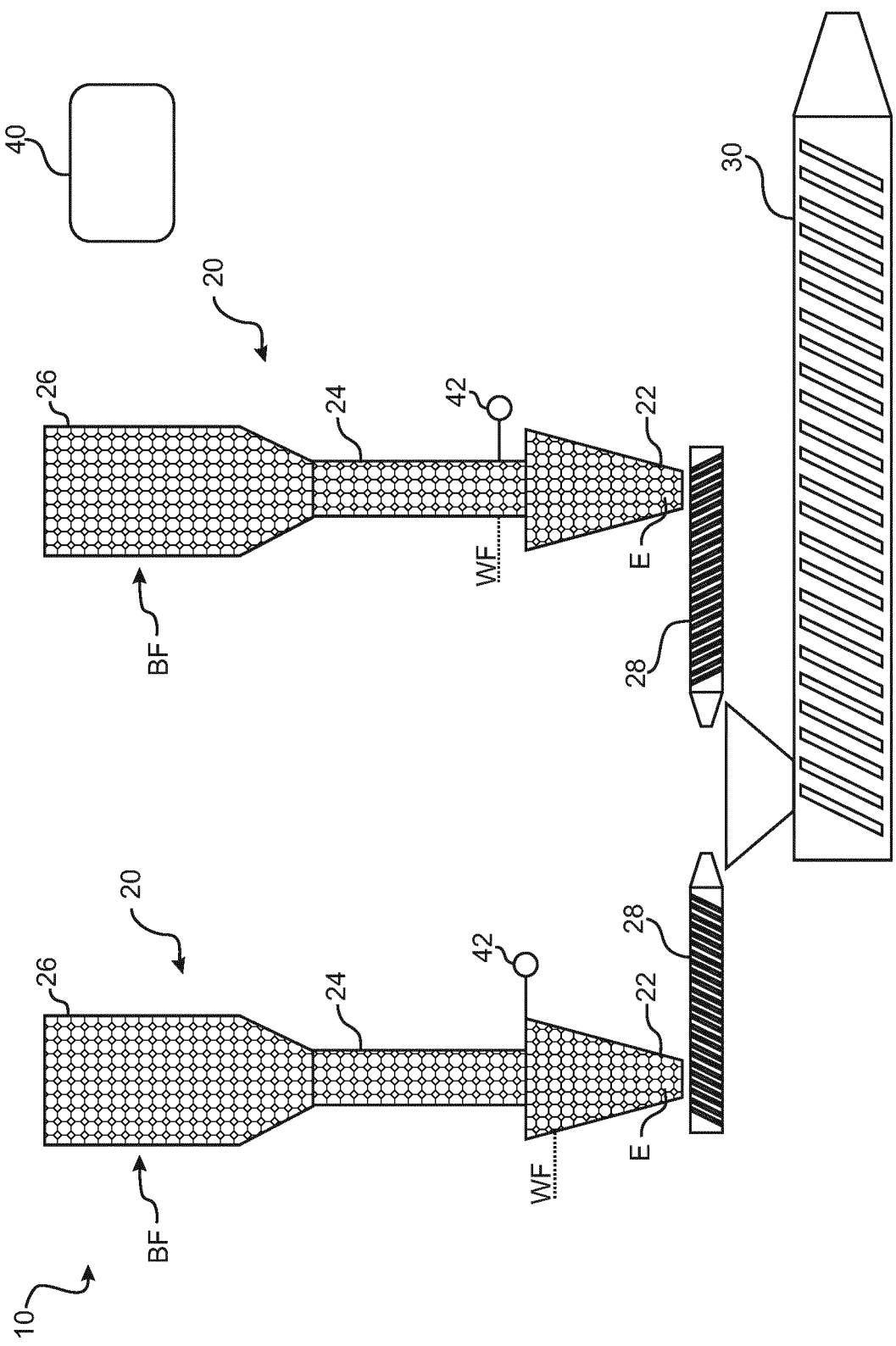

(51) Int. Cl.
   *B29C 48/27* (2019.01)
   *B29C 48/285* (2019.01)
   *B29B 7/60* (2006.01)
   *B29C 48/08* (2019.01)
   *B29C 48/10* (2019.01)
   *B29C 31/02* (2006.01)

(52) U.S. Cl.
   CPC ............ *B29C 48/286* (2019.02); *B29C 48/92* (2019.02); *B29C 31/02* (2013.01); *B29C 48/08* (2019.02); *B29C 48/10* (2019.02); *B29C 2948/9298* (2019.02); *B29C 2948/92333* (2019.02)

(56) References Cited

FOREIGN PATENT DOCUMENTS

| DE | 102004051196 A1 | * | 4/2006 | ........... B29C 48/285 |
|----|-----------------|---|--------|-----|
| DE | 102013100812 A1 | | 7/2014 | |
| EP | 0394869 A2 | | 10/1990 | |
| EP | 0899079 A1 | | 3/1999 | |
| JP | S62257816 A | | 11/1987 | |
| JP | H09123252 A | | 5/1997 | |

OTHER PUBLICATIONS

Machine translation for DE10018321 of record (Year: 2001).*
Notification of the First Office Action for Chinese Application No. 201680033031.4 dated Jun. 4, 2019, with its English translation, 12 pages.
Technical Paper—Smart Refill Technology in Loss-in-Weight Feeding, K-TRON, T-900017-en, 2011, 5 pages.
Notification of the Second Office Action for Chinese Application No. 201680033031.4 dated Feb. 3, 2020, with its English translation, 9 pages.
Examination Report for European Application No. 16723698.3 dated Jul. 28, 2020, with its English translation, 7 pages.
Third Office Action for Chinese Application No. 201680033031.4 dated Jul. 29, 2020, with its English translation, 13 pages.
Fourth Office Action for Chinese Application No. 201680033031.4 dated Mar. 17, 2021, with its English translation, 6 pages.

* cited by examiner

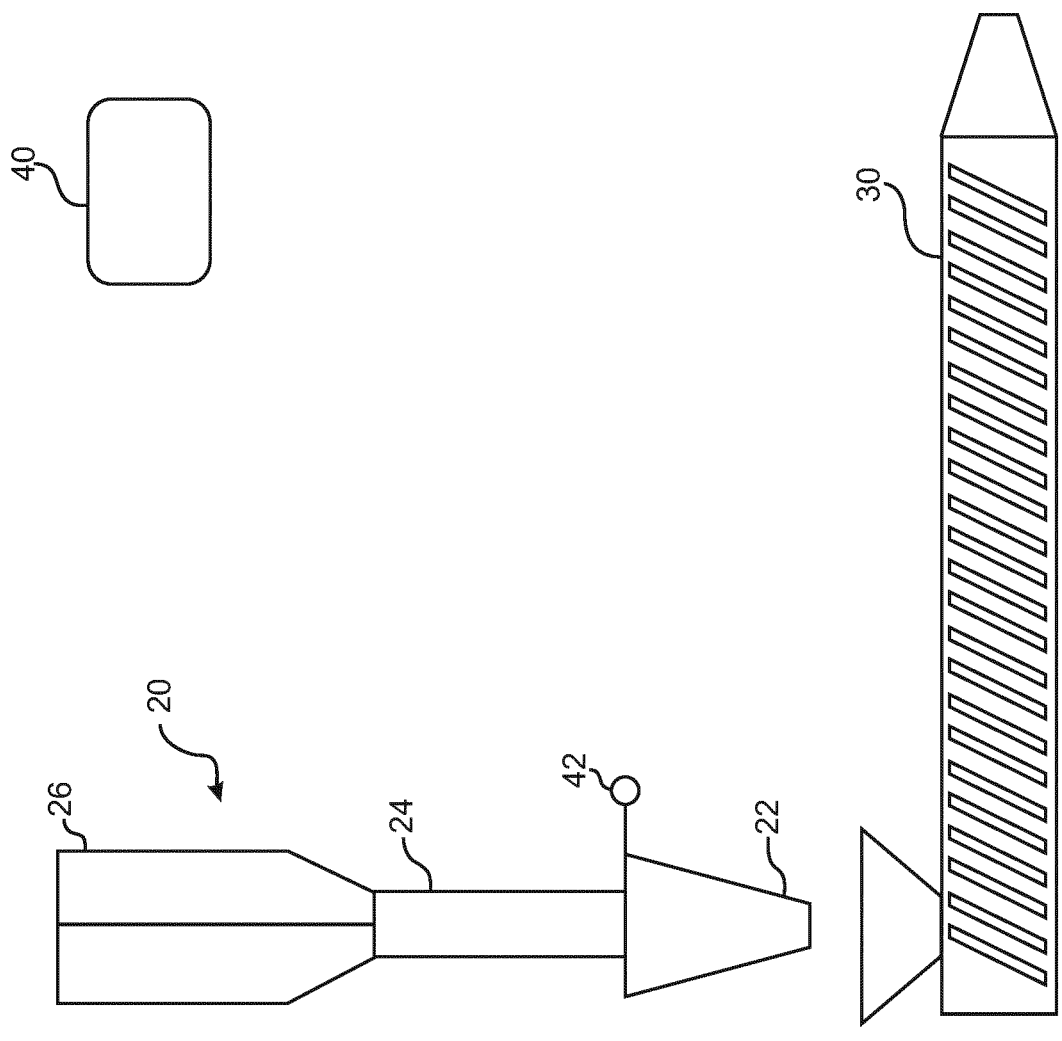

METHOD FOR PREPARING FOR A CHANGE OF MATERIAL IN AN EXTRUSION DEVICE FOR A FILM MACHINE

The present invention relates to a method for preparing for a change of material in an extrusion device for a film machine as well as to a corresponding extrusion device with the option of carrying out such a method.

It is basically known that material changes have to be carried out in extrusion devices for film machines. For example, different products, which differ in particular with regard to their used formulas and thus with regard to their used material compositions, can thus be produced on a film machine. To be able to run different material compositions on a production machine, the different feedstocks need to be adapted or changed, respectively. In other words, a change of material can be carried out between the materials of an application formula and the materials of a subsequent formula.

A disadvantage of the known solutions is that the change of material is carried out at the end of the order, thus when the desired quantity of products of a feedstock or of an application formula, respectively, has been produced. At that point in time, the respective feedstock is located in an extrusion device in a feed unit for feeding this feedstock to the extruder. To be able to carry out the change of material, the feedstock needs to now be discharged manually from this feed unit and needs to be replaced by the subsequent feedstock, which can be identified as subsequent material at that point in time. As a result, the entire material quantity of feedstock, which is still located in the feed unit at that point in time, needs to be discharged, and is considered to be waste.

Moreover, the discharge of the feedstock from the feed unit is a time-consuming process, because it is necessary to wait until the entire quantity of feedstock has discharged from the feed unit, in particular by means of gravity conveyance.

It is the object of the present invention to at least partially eliminate the above-described disadvantages. It is in particular the object of the present invention to reduce the time for the change of material in a cost-efficient and simple manner and to preferably also reduce the amount of waste.

The above object is solved by means of a method comprising the features as described herein as well as an extrusion device comprising the features as described herein. Further features and details of the invention follow from the depending claims, the description and the drawings. It goes without saying that features and details, which are described in connection with the method according to the invention, shall thereby also apply in connection with the extrusion device according to the invention and in each case vice versa, so that, with regard to the disclosure, reference is or can always be mutually made, respectively, to the individual invention aspects.

A method according to the invention serves the purpose of preparing a change of material in an extrusion device for a film machine. Such an extrusion device is equipped with at least one feed unit for feeding feedstock to an extruder. The method according to the invention comprises the following steps:
   predetermining an end of a production order of an extrusion device,
   specifying a reduced changing filling level for the at least one feed unit,
   maintaining the filling level of the at least one feed unit at the reduced changing filling level for the further production with the extrusion device.

According to the invention, the production order is thus now monitored and is predetermined with regard to an expected end. This can take place for example by calculating the remaining running time based on the residual quantity of the production order. It is also conceivable, however, for the predetermining to include a manual input by the operating personnel of the extrusion device. A control unit of an extrusion device, on which a method according to the invention can be carried out, is now able to identify the end of a production order in this way and to use it as the basis for the further regulation of the process. The production order means in particular that a product, which is ready for sale, of a film is produced during the production order. The production order has to be differentiated from the intermediate period or the changing period, respectively, between two production orders, in which the subsequent formula is not yet produced and in which the application formula is also not in the process any longer. This changing period thus leads to a waste material, which cannot be identified as product, which is ready for sale.

If a control unit now identifies the end of a production order when carrying out a method according to the invention, the specification of a reduced changing filling level for the at least one feed unit can be made on this basis. A changing filling level is thereby in particular reduced with regard to the regular operating filling level inside the respective feed unit. To ensure that the risk that the extruder drains during operation is reduced to a minimum during operation, relatively large quantities of feedstock are typically kept available in the feed unit with a correspondingly large buffer effect. This prevents that a draining of the extruder occurs even in the case of mechanical malfunctions of a supply device into the feed unit. As soon as the production end or the end of the production order, respectively, has been predetermined, a reduced changing filling level can now however be specified. This thus has the result that the filling level inside the respective feed unit drops during the period of the further production, until the corresponding changing filling level is reached as reduced changing filling level, based on the operating filling level. According to the invention, this filling level of the at least one feed unit is now maintained at the reduced changing filling level for the further production with the extrusion device. This means that, starting at that point in time, the further operating process is now carried out with a lower buffer effect. Due to the fact, however, that this is a point in time, at which the end of the production order is already predetermined, a machine operator is typically also present at the location of the production. It is thus no longer necessary to provide the high buffer effect, because the machine operator can now react flexibly and quickly in the case of an error.

Maintaining the filling level at the reduced changing filling level can thereby take place in a constant manner as well as in batches. This depends in particular on the type of subsequent conveyance. So-called batch processes are known, in the case of which a refilling from a feed container to a down pipe or a weighing funnel can in particular take place in batches or continuously. It is also conceivable that a follow-up of feedstock into the feed unit is provided with the help of a suction conveyance. In the case of a maintaining of the filling level in batches, a refilling thrust is thus made exactly when the filling level reaches the reduced changing filling level. The maintaining of the filling level is to thus in particular be understood in such a way that this filling level does not fall below or only falls below the reduced changing filling level by a minimal and predefined amount, for example by approximately 10%.

The above-described method is carried out until the actual change of material is initiated. An extended production can moreover also be carried out in this way on the basis of this method with the reduced changing filling level, if this is a flexible desire of the machine operator.

A feed unit can thereby preferably be equipped as weighing funnel, down pipe and/or feed container, wherein a suction conveyance or a batch feed for the refilling functionality of the feed unit can be provided. A film machine can be a blown film production or also a different type of film production, in particular a so-called cast film production.

A method according to the invention is associated with several advantages. The quantity of feedstock, which is located in the respective feed unit, is significantly reduced with regard to the reduced changing filling level, in particular at the time the change of material starts. This means that a smaller quantity of feedstock needs to be removed from the feed unit for carrying out the change of material. This has in particular two significant effects. On the one hand, the expenditure of time for discharging the residual feedstock, which is reduced in this way, is reduced significantly. For the case that the discharged feedstock is material, which cannot be recycled, the waste or scrap, respectively, which is created therewith at the same time, is reduced significantly therewith.

It may be advantageous when, in the case of a method according to the invention, the filling level of the at least one feed unit is increased in batches, in particular in a single refilling thrust, when the filling level falls below the changing filling level. This is to be understood in such a way that in particular no continuous subsequent conveyance takes place, but that an in particular defined refilling quantity is in fact always introduced into the feed unit with the help of refilling thrusts. Provision can thus be made for example for a common suction device, which provides suction thrusts for all feed units with the help of a low pressure and a single pump. A feed unit can thus always be operated with a refilling thrust or a plurality of refilling thrusts. A limitation to in particular a single refilling thrust has the result that the fluctuation prior to the refilling thrust and after the refilling thrust, and thus the amplitude, at which the actual filling level fluctuates in response to carrying out a method according to the invention, is reduced. In the case that the change of material starts exactly when a refilling push has just been introduced, the quantity of feedstock, which is to be maximally discharged in this way, is reduced significantly. A fluctuating filling level and simultaneously a corresponding combination of a residual buffer of the feedstock and the reduced changing filling level thus results.

It is advantageous when, in the case of the embodiment of the above paragraph, the increase of the filling level in batches is made with a single refilling thrust, which refills less feedstock than an operating thrust during the normal production operation of the extrusion device. This means that substantially a complete refilling of the feed unit to an upper maximum filling level has to take place during the normal production operation, in order to continue to provide the maximum buffer effect. To prepare for the change of material, it may now be advantageous for a method according to the invention to reduce this operating thrust to a refilling thrust. This is ensured in particular in that the time period, during which suction takes place, thus the duration of the refilling thrust, is reduced as compared to the duration of the operating thrust, for example in the case of a suction conveyor. As a result, not only a reduction of the number of the refilling thrusts, but in fact also a reduction of the quantity per refilling thrust can be capable of being attained in response to an increase of the filling level in batches. An even further reduced changing amplitude is thus attained between the actual filling level and the changing filling level, so that a shortened refilling time for this refilling thrust can moreover be expected as well. A slighter blockade for other feeds thus takes place, so that a smaller buffer can also be used in this way for the other feed units.

It is a further advantage when, in the case of a method according to the invention, the volume and/or the weight of feedstock, which corresponds to the changing filling level in the feed, has a refilling ratio of between 0.5:1 and 10:1 with the volume and/or the weight of the feedstock of a refilling thrust. This thus means that a defined specification of the relation between the refilling and the remainder of feedstock is specified. A refilling ratio of between 0.5:1 and 5:1 is preferred, a refilling ratio of between 1:1 and 4:1 is particularly preferred. In individual cases, it may be preferred, when the refilling ratio is in the range of between 1.5:1 and 2.5:1. In particular in the case of ranges, in which a small refilling thrust is sufficient to maintain a corresponding quantity of feedstock at changing filling level, are thereby preferred. On the one hand, an absolute reduction of the residual filling level inside the feed unit as a result of the reduced changing filling level is thus advantageous. On the other hand, a reduction of the corresponding amplitude is expedient, in order to obtain the smallest possible exceeding of the changing filling level for the most negative case of the change of material, thus the start of the change of material directly after a refilling thrust.

It may be a further advantage when, in the case of a method according to the invention, a minimal filling level, which is smaller than the changing filling level, is specified at a defined point in time prior to the end of the production order, and when the filling level of the at least one feed unit is maintained above the minimal filling level for the further production with the extrusion device. This is thus a so-called two-stage filling level process. After initiating a method according to the invention, it is thus verified, whether a minimal filling level may be expedient. This can be direct as well as indirect. A control unit is thus brought into a changing state according to the invention either manually or automatically, and will approach the corresponding changing filling level. As soon as the operating personnel is in the vicinity and desires to start the change of material, the buffer effect inside the respective feed unit can be reduced even further, because the change of material is imminent. A component-specific selection can thus be made in manual direct manner or by means of a defined specification in an automatic manner, for example with the help of a defined point in time of approximately five minutes. As a result, an even further reduction of the filling level to the minimal filling level takes place and the maintaining function of the filling level for the respective feed unit is now carried out for this minimal filling level. This, however, is only sufficiently safe, when the operating personnel is in fact in the vicinity and if the last phase immediately prior to the actual change of material now does prevail.

It is a further advantage when, in the case of a method according to the invention, provision is made for at least two feed units, wherein a specific changing filling level is specified for each feed unit in the extrusion device.

The respective feed unit can also be identified as component or material component. Every material component in the respective formula is thus specific with regard to the used quantity and the associated conveying speed. If, for example, a material component, which takes effect only with a very small percentage in the entire application formula, is stored in a feed unit, the corresponding conveying speed for this feed unit will be very low. If, in contrast thereto, a different material component is used in a different feed unit with a high volume percentage, a high conveying quantity will provide a correspondingly quick outputting of this material from the feed unit there. As a function of the different outputting speeds, different changing filling levels can now be provided. In the case of a lower outputting speed, a similar buffer effect can thus also be attained with a significantly smaller changing filling level, than is the case in the case of a high outputting speed for a correspondingly other feed unit. A material-specific reduction of the time or of the material, respectively, thus takes place and thus an option for a further optimization for carrying out the method according to the invention.

It is also advantageous when, in the case of a method according to the invention, the lowering time, which is required by the further production for lowering the filling level to the changing filling level, for the at least one feed unit is determined after predetermining the end of the production order, and when the reduced changing filling level is specified, when the remaining time to the end of the production order is equal to the lowering time. This means that when the production order is predetermined with regard to its end, it is simultaneously predetermined, how long the lowering of the filling level will take as a function of the actual production parameters. The lowering time for the respective feed unit is thus longer, when the conveying speed for this feed unit is low, and is shorter, when the conveying speed for this feed unit is quick. As soon as the remaining time to the end of the production order is now equal to this lowering time, the specification of the reduced changing filling level specifically for this feed unit starts. Columns, which drop at different speeds, thus follow, wherein the lowering of the respective column of a feed unit can start at different points in time. It goes without saying that the embodiment condition, namely that the remaining time is equal to the lowering time, is to be understood to be a technically fluctuating range. A tolerance of up to +10% can thus be possible in response to the triggering due to the equality between lowering time and remaining time. It goes without saying that provision can also be made for residual buffers, so that all feed units are at the desired changing filling level and thus in the preparatory operation, for example five minutes prior to or also after the end of a corresponding production order.

It is further advantageous when, in the case of a method according to the invention, a filling level signal, which includes in particular at least one of the following pieces of information, is received by a control device in order to maintain the filling level:

weight of an at least partially filled weighing funnel of the at least one feed unit
  filling level in a weighing funnel of the at least one feed unit
  filling level in a down pipe of the at least one feed unit
  filling level in a feed container of the at least one feed unit The above enumeration is not a conclusive list. It goes without saying that a filling level signal can be received by a control device, and can also have two or more pieces of information. Different signals or different sensors, restively, which provide the desired signals, are thus conceivable.

An extrusion device comprising an extruder and at least one feed unit for feeding feedstock to the extruder is also a subject matter of the present invention. Such an extrusion device has a filling level sensor for determining the filling level in the at least one feed unit. Provision is further made for a control device for predetermining an end of a production order of an extrusion device, a specifying of a reduced changing filling level for the at least one feed unit, and for a maintaining of the filling level of the at least one feed unit at the reduced changing filling level for the further production with the extrusion device. It is advantageous, when the control device is embodied for carrying out a method according to the invention. An extrusion device according to the invention is thus associated with the same advantages, as they have been discussed in detail with reference to a method according to the invention.

Figure 2:
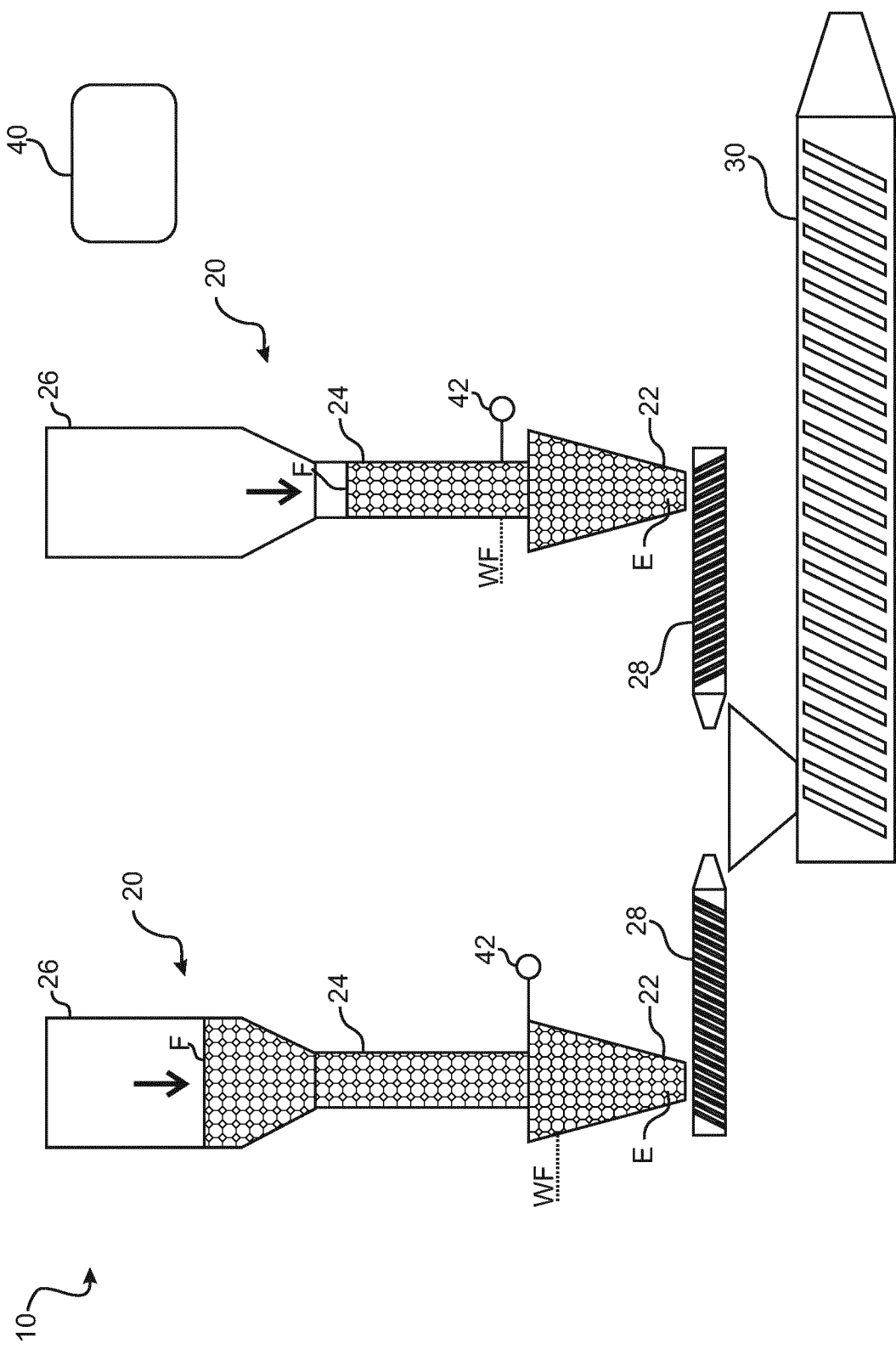
Figure 3:
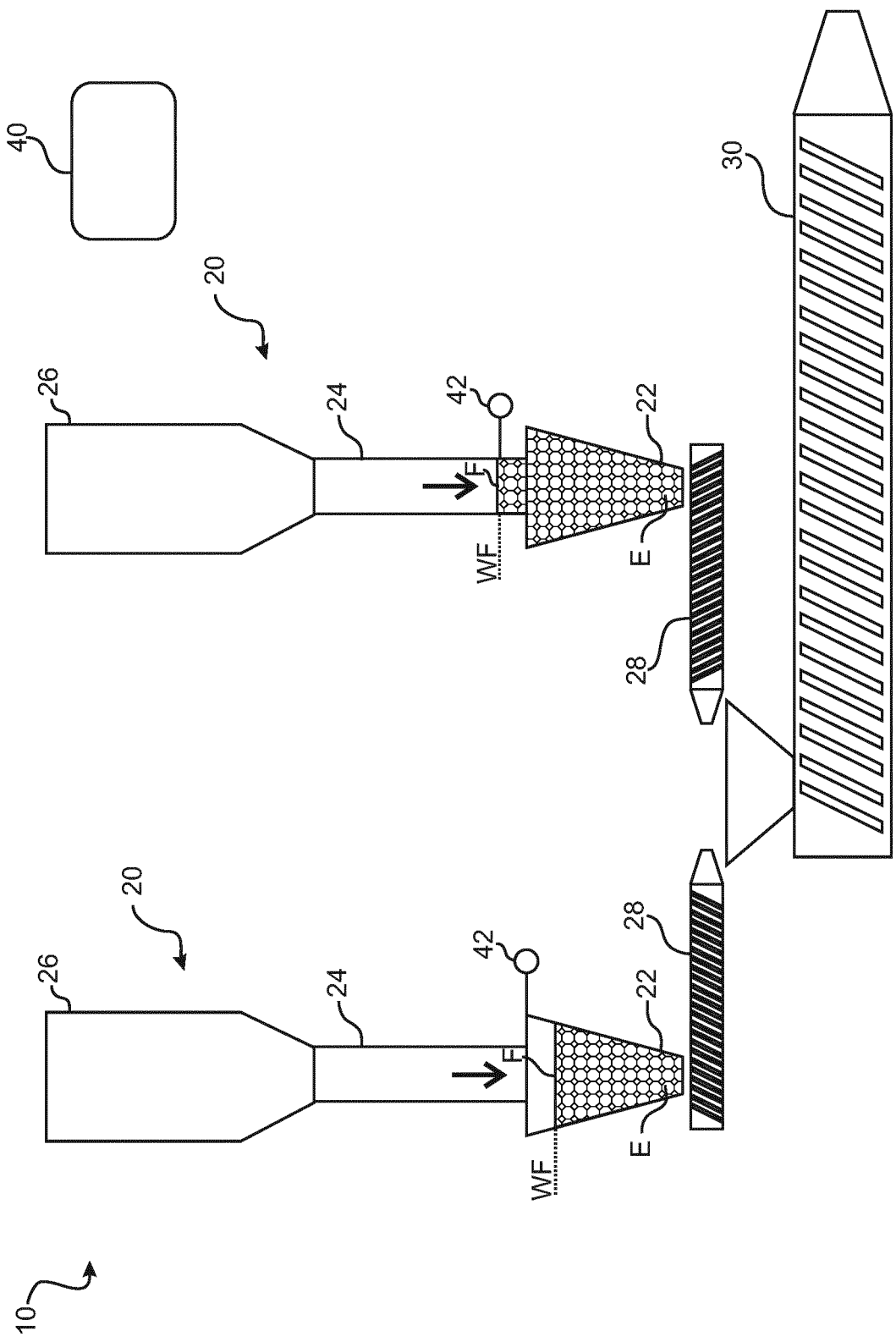
Figure 4:
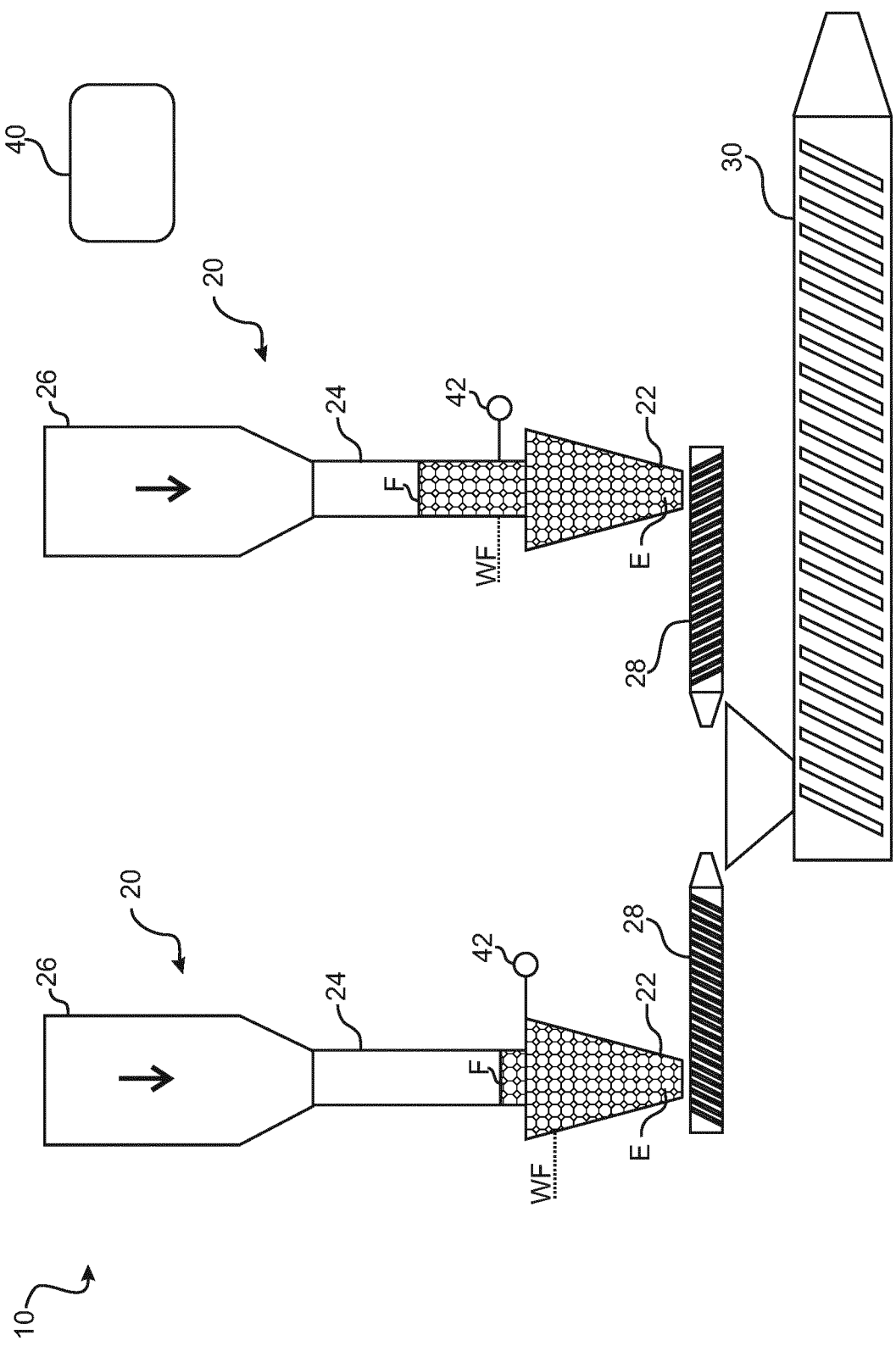
Figure 5:
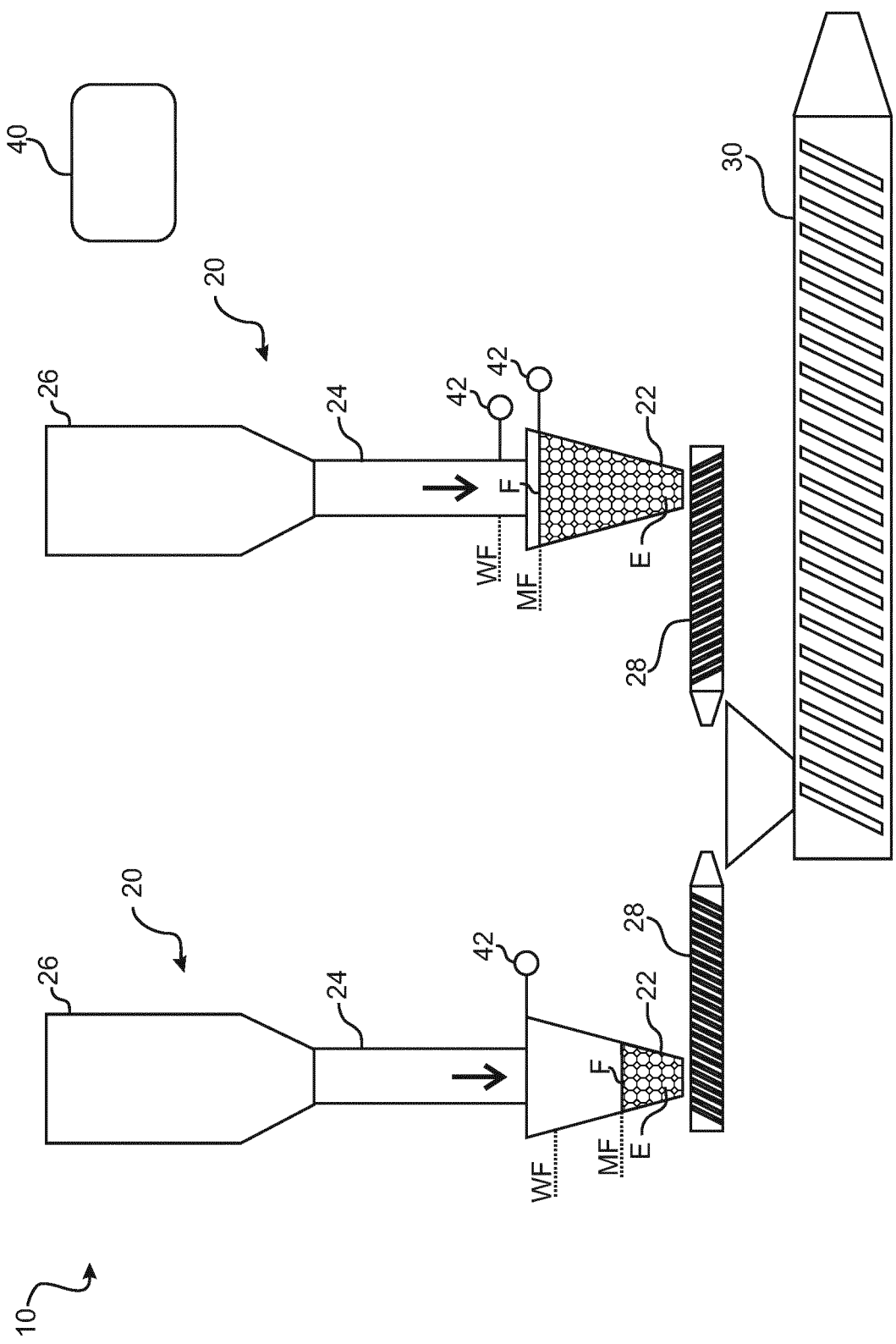
Figure 6:
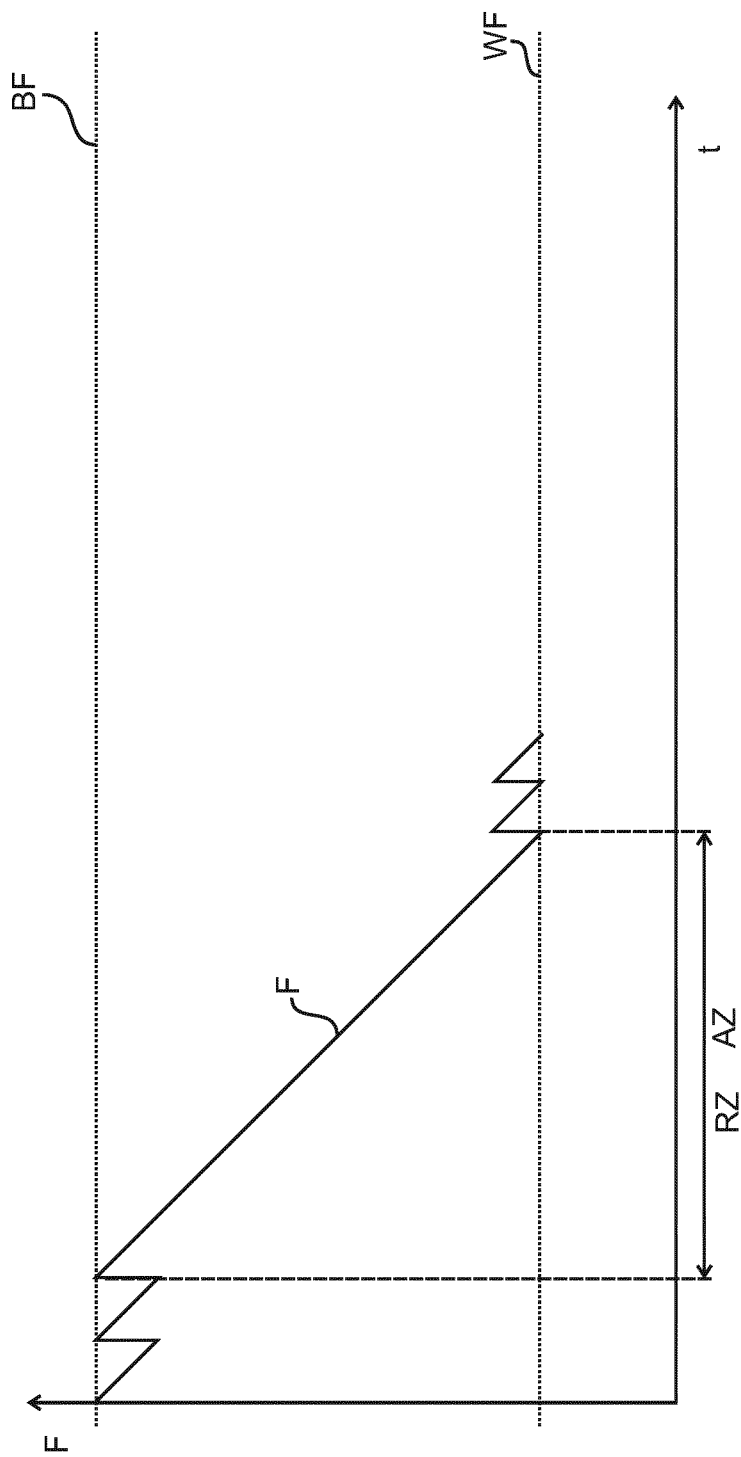

Further advantages, features and details of the invention follow from the description below, in which exemplary embodiments of the invention are described in detail by referring to the drawings. The features mentioned in the claims and in the description can thereby be significant for the invention, in each case alone or in any combination. Schematically:

FIG. 1 shows an embodiment of an extrusion device according to the invention, FIG. 2 shows the embodiment of FIG. 1 during the lowering of the filling levels, FIG. 3 shows the embodiment of FIGS. 1 and 2 with filling levels at changing filling level, FIG. 4 shows the embodiment of FIGS. 1 to 3 during a refilling thrust, FIG. 5 shows the embodiment of FIGS. 1 to 4 during a minimal filling level, FIG. 6 shows the filling level course in a schematic illustration and FIG. 7 shows an alternative embodiment of an extrusion device.

An extrusion device 10 according to the invention is discussed in more detail by means of FIGS. 1 to 5. In the case of this embodiment, said extrusion device is equipped with two feed units 20 in a schematic and exemplary manner. Each of these feed units 20 has a storage container 26, a down pipe 24 and a weighing funnel 22. In the normal operating mode, the respective feed unit 20 is completely filled with feedstock E here, so that FIG. 1 substantially represents an operating filling level BF for the feedstock E.

As soon as a request to change the material is identified, a control device 40 can carry out a corresponding method according to the invention. As a result, the production end is now predetermined and a corresponding lowering of the individual filling levels F is carried out in the feed units 20 by means of the predetermination, in particular in correlation with the lowering time AZ and a remaining time RZ for the production end. A snapshot during these dropping filling levels F is illustrated in more detail in FIG. 2.

The lowering of the filling levels F is ended, when the situation according to FIG. 3 has been reached. In order to identify this situation, provision is made here for filling level sensors 42. In the case of the right feed unit 20, this filling level sensor 42 is embodied as inductive sensor, which can identify exactly one filling level. Due to the fact that provision is in each case made in the case of the left and right feed unit 20 for a weighing funnel 22, a filling level sensor 42 can now also be coupled to this weighing system in the case of the left feed unit 20. A further changing filling level WF can thus be specified here via a weight evaluation. As soon as the respective filling level F has now reached the corresponding changing filling level WF, the control device 40 will try to maintain the changing filling level WF. A falling below is to be avoided thereby or a maximum falling below of approximately 10% is to be maintained. At the point in time as shown in FIG. 3, a refilling will now take place inside the feed units 20. This takes place in particular in batches, for example with the help of a single refilling thrust. The filling level F in the two feed units 20 thus now increases significantly above the changing filling level WF again. This situation is maintained until the change of material is now in fact carried out.

FIG. 5 shows that a further reduction and thus a second reduction of the filling level F can now also take place in particular on the basis of a manual input by a machine operator. A minimal filling level MF is thus specified here, so that the feedstock E, which remains in the respective feed unit 20, is reduced even further. As can be seen in FIGS. 1 to 5, the residual quantity of the feedstock E is thus reduced, which needs to be considered in response to the change of material, which is to be carried out. On the one hand, the waste or the scrap, respectively, of discharged residual material of the feedstock E is thus reduced. On the other hand, the period, which is necessary for discharging the residual feedstock E from the respective feed unit 20, is reduced significantly.

FIG. 6 shows, schematically, how a filling level F can develop over time. On the top left, the filling level F thus starts at an operating filling level BF and thus with filled feed units 20. During the course of the production, the filling level F also drops here, but a refilling thrust effects a refilling to the operating filling level BF again and again. This leads to a corresponding saw tooth characteristic on the top left in FIG. 6. As soon as the production end has been predetermined, the method according to the invention can start, so that the filling level F now drops. A corresponding period, which is equal to or substantially equal to the remaining time RZ to the end of the production order in this embodiment, needs to in particular be considered thereby. As soon as the filling level F has now reached the changing filling level WF, a falling below of this changing filling level WF is prevented by means of a refilling thrust. The system is maintained in this situation, so that a saw tooth profile, which prevents the filling level F from falling below the changing filling level WF or reduces it to a minimum, now also forms on the bottom right.

FIG. 7 shows an alternative embodiment of an extrusion device 10. With regard to the advantages described according to the invention, said extrusion device is based on the embodiment of FIG. 1, but differs in the refilling function. Provision is thus made here for a so-called batch process for the refilling. The feed container 26 is equipped with separate volumes, so that each volume of the feed container 26 can be understood to be a feed unit 20. Components in the form of the down pipe 24 and of the weighing funnel 22 arranged therebelow are thus common components of the different feed units 20. Provision is made below the weighing funnel 22 for a mixing funnel, in particular comprising a mixer drive, which allows for a homogenization prior to entering the extruder.

The above discussion of the embodiments describes the present invention only in the context of examples. It goes without saying that individual features of the embodiments, if technically expedient, can be combined freely with one another, without leaving the scope of the present invention.

LIST OF REFERENCE NUMERALS 10 extrusion device
20 feed unit
22 weighing funnel
24 down pipe
26 feed container
28 dosing screw
30 extruder
40 control device
42 filling level sensor
E feedstock
BF operating filling level
WF changing filling level
MF minimal filling level
F filling level
AZ lowering time
RZ remaining time
t time

The invention claimed is:

1. A method for preparing for a change of material in an extrusion device for a film machine comprising two feed units for feeding feedstock to an extruder, comprising the following steps which are carried out by a control device as soon as a request to change the material is identified:
   monitoring a production order and predetermining an end of the production order of the extrusion device automatically by calculating a remaining production time based on a remaining quantity of the production order,
   specifying a reduced changing filling level for each feed unit, and
   maintaining a filling level of each feed unit at the reduced changing filling level for a further production with the extrusion device,
   wherein the control device identifies the end of the production order and uses the end of the production order as a basis for further regulation of the method, and the control device makes the specification of the reduced changing filling level for each feed unit on this basis, wherein the changing filling level is reduced with regard to a regular operating filling level inside each respective feed unit,
   wherein a lowering time, which is required by the further production for lowering the filling level to the changing filling level, for each feed unit is determined after predetermining the end of the production order, and the reduced changing filling level is specified, when a remaining time to the end of the production order is equal to the lowering time,
   wherein the film machine comprises two feed units,
   wherein a specific changing filling level is specified for each feed unit of the extrusion device, and wherein a lowering of a respective column of a corresponding feed unit of the two feed units starts at different points in time, if columns of the two feed units drop at different speeds.

2. The method according to claim 1,
   wherein the filling level of each feed unit is increased in batches, when the filling level falls below the changing filling level.

3. The method according to claim 2,
   wherein the increase of the filling level in batches is made with a single refilling thrust, which refills less feedstock than an operating thrust during a normal production operation of the extrusion device.

4. The method according to claim 2,
   wherein at least a volume or a weight of feedstock, which corresponds to the changing filling level in each feed unit, has a refilling ratio of between 1:1 and 2:1 with at least a volume or a weight of the feedstock of a refilling thrust.

5. The method according to claim 1,
wherein a minimal filling level, which is smaller than the changing filling level, is specified at a defined point in time prior to the end of the production order, and the filling level of each feed unit is maintained above the minimal filling level for the further production with the extrusion device.

6. The method according to claim 1,
wherein a filling level signal is received by the control device in order to maintain the filling level.

7. The method according to claim 2,
wherein
the filling level of each feed unit is increased in a single refilling thrust, when the filling level falls below the changing filling level.

8. The method according to claim 6,
wherein
the filling level signal includes at least one of the following pieces of information:
- weight of an at least partially filled weighing funnel of the respective feed unit,
- filling level in a weighing funnel of the respective feed unit,
- filling level in a down pipe of the respective feed unit, and
- filling level in a feed container of the respective feed unit.

\* \* \* \* \*